United States Patent [19]

Attwood et al.

[11] 4,167,605
[45] Sep. 11, 1979

[54] ARTICLE WITH ANTISTICK COATING AND COMPOSITION

[75] Inventors: Terence E. Attwood, Kimpton; Ronald P. Buckley, Stevenage, both of England

[73] Assignee: Imperial Chemical Industries Limited, London, England

[21] Appl. No.: 875,545

[22] Filed: Feb. 6, 1978

Related U.S. Application Data

[62] Division of Ser. No. 707,766, Jul. 22, 1976, Pat. No. 4,090,993.

[30] Foreign Application Priority Data

Jul. 29, 1975 [GB] United Kingdom ............... 31709/75

[51] Int. Cl.$^2$ ............................................. B32B 27/06
[52] U.S. Cl. ................ 428/419; 260/29.6 F; 427/385 R; 427/385 A; 427/385 C; 427/388 C; 428/421; 428/422; 428/442; 525/3
[58] Field of Search ........... 427/385 R, 388 C, 385 A, 427/385 C; 260/900, 29.6 F; 428/422, 419, 442, 421, 463, 500

[56] References Cited

U.S. PATENT DOCUMENTS

| 3,400,065 | 9/1968 | Barth ................................. 204/159.20 |
| 3,622,376 | 11/1971 | Tieszen et al. ...................... 428/419 |
| 3,884,873 | 5/1975 | Short ................................. 260/900 X |
| 3,935,347 | 1/1976 | Blackwell ........................... 427/388 |
| 3,968,289 | 7/1976 | Higbee ............................. 427/385 X |
| 3,981,945 | 9/1976 | Attwood et al. .................... 260/900 |
| 3,992,347 | 11/1976 | Vary .................................. 260/30.2 |
| 3,993,843 | 11/1976 | Vasta ................................. 428/422 |
| 3,994,847 | 11/1976 | Marcantonio et al. ........... 260/900 X |
| 4,020,046 | 4/1977 | King et al. .......................... 260/900 |
| 4,021,395 | 5/1977 | Vary .................................. 260/29.2 R |

Primary Examiner—Morris Kaplan
Assistant Examiner—Thurman K. Page
Attorney, Agent, or Firm—Cushman, Darby & Cushman

[57] ABSTRACT

A coating composition comprises a dispersion of a fluorocarbon polymer in an inert diluent having dissolved, or preferably dispersed, therein a low molecular weight (RV less than 0.25) polyethersulphone or precursor thereto.

6 Claims, No Drawings

ARTICLE WITH ANTISTICK COATING AND COMPOSITION

This is a division of application Ser. No. 707,766, filed July 22, 1976, now U.S. Pat. No. 4,090,993.

This invention relates to coating compositions and in particular to compositions that exhibit non-stick properties, e.g. for cookware.

Tetrafluoroethylene polymers, i.e. homopolymers of tetrafluoroethylene and copolymers of tetrafluoroethylene with up to 15% by weight of other monomers such as ethylene, vinyl chloride, vinyl fluoride and hexafluoropropene have heretofore been widely used for such applications, often in admixture with other plastics materials which act as binders. An example of such a coating composition is described in our U.K. Pat. No. 1 253 971.

In our U.K. Pat. No. 1 426 342 we describe coating compositions comprising a tetrafluoroethylene polymer and a thermoplastic aromatic polyethersulphone. The preferred polyethersulphones of those compositions had molecular weights corresponding to reduced viscosities of at least 0.3.

Reduced viscosity (RV) as used herein refers to viscosity measurements made at 25° C. on a solution of the polymer in dimethyl formamide containing 1 g of polymer in 100 $cm^3$ of solution.

We have found that while satisfactory coating compositions can be made from such polyethersulphones by dispersing the tetrafluoroethylene polymer in a solution of the polyethersulphone in a solvent therefor, e.g. dimethyl formamide, coatings made from wholly aqueous dispersions of such polyethersulphones, while exhibiting good adhesion to the substrate, are discontinuous. Such discontinuous coatings often have a speckled appearance in contrast to the uniform mat appearance of a continuous coating.

It has also been proposed in U.S. Pat. No. 3,622,376, to make coating compositions containing a poly(arylene sulphide) and titanium dioxide. It was proposed therein to incorporate 0.5 to 50% by weight, based on the weight of the poly(acrylene sulphide), of a fluorocarbon polymer, i.e. a fluorocarbon polymer/poly(arylene sulphide) weight ratio of 1:2 to 1:199. Preferred compositions contained 5 to 20% by weight of polytetrafluoroethylene (PTFE), i.e. a PTFE/poly(arylene sulphide) weight ratio of 1:4 to 1:19. Such coating compositions were preferably applied to the desired substrate in the form of a slurry of the ingredients in an inert diluent and, after diluent removal, were fused to give a continuous coating.

We have found that, by utilising low molecular weight polyethersulphones, continuous coatings exhibiting good adhesion can be obtained from aqueous coating dispersions. We have further found that coatings made from such compositions exhibit improved adhesion compared with coatings made from a composition containing a similar proportion of a poly(arylene sulphide). Thus it is possible, by using the compositions of the present invention, to utilise a greater proportion of the tetrafluoroethylene polymer in the coating and so the lubricating, or "non-stick", properties of the coating are not decreased unduly by the presence of the binder polymer.

Accordingly we provide a coating dispersion comprising a tetrafluoroethylene polymer dispersed in an inert diluent having dissolved, or preferably dispersed, therein a thermoplastic aromatic polyethersulphone of reduced viscosity below 0.25, or the precursor to such a polyethersulphone.

By the term precursor to a polyethersulphone, we mean monomeric material, which is polymerisable by the action of heat, to form a polyethersulphone. Examples of such monomeric materials include alkali metal salts of phenols containing halophenylsulphonyl groups with the halogen ortho or para to the sulphone group, such as the potassium salt of 4-(4-chlorophenylsulphonyl) phenol (the polymerisation of which to form polyethersulphones is described in our U.K. Pat. No. 1 153 035) and mixtures in approximately equimolar amounts of a dialkali metal salt of a bisphenol with a dihalobenzenoid compound in which each halogen atom is activated by a sulphone group ortho or para thereto. Polymerisation of such a mixture, e.g. the dipotassium salt of 2,2-bis-(4-hydroxyphenyl)propane and bis-(4-chlorophenyl)sulphone, in the absence of a polar solvent has been described in, for example, U.K. Pat. No. 1 417 664.

We prefer however to utilise a preformed polymer. The preferred polyethersulphones made by a nucleophilic polymerisation process may have halogen end groups or alkali metal phenate (—OM) end groups, (where M is alkali metal). When made from a single monomer, e.g. by self condensation of a halophenate, the halogen and phenate end groups will be present in equal proportions and polymerisation may continue, upon heating, after coating a substrate with the dispersion, producing a higher molecular weight polymer and an alkali metal halide. (This would also be the case if an equimolar mixture of an activated dihalobenzenoid compound and a bisphenate had been employed to make the polyethersulphone.) The formation of alkali metal halide in the coating is undesirable as it could be leached out, e.g. by washing of the coated article leaving pinholes which would expose the substrate and, if the substrate is metallic, the alkali metal halide could promote corrosion. In addition, in the case of coated cookware, pinholes give rise to the possibility of build up of food and/or cooking oil or fat which could degrade and discolour the cooking utensil.

For these reasons we prefer to use polyethersulphones that do not contain phenate end groups. Such polyethersulphones may be made by the addition of a small amount of an activated dihalobenzenoid compound to halophenate polymerisation so that any phenate end groups are reacted to give a polyethersulphone having halogen end groups. In the case of polyethersulphones made from an activated dihalobenzenoid compound and a bisphenate, a very slight excess of the dihalobenzenoid compound may be employed so as to obtain polyethersulphones with halide end groups.

However such processes are subject to variability partly because the total amount of dihalobenzenoid compound present cannot be assessed sufficiently accurately or reproducibly.

An alternative method of obtaining a polyethersulphone with stabilised end groups is by converting the phenate (—OM) end groups remaining when polymerisation has proceeded to the desired extent to alkoxy (—OR) end groups (where R is an alkyl group containing 1 to 4 carbon atoms) by addition of an alkyl halide such as methyl chloride. Alternatively the phenate end groups can be converted to —OH end groups by acidification or by reaction with an alkyl halide, such as t-butyl chloride, that eliminates HCl rather than undergoes the substitution reaction. (Such a process for the production of polyethersulphones having —OH end groups is described in our Belgian Pat. No. 819 303.)

As disclosed in our U.K. Pat. No. 1 342 589, polyethersulphones having —OH end groups may give better adhesion than polyethersulphones having alkoxy end groups.

In addition we have found that the nature of the polyethersulphone end groups has an effect on the viscosity of the dispersion and phenate end grouped polyethersulphones tend to give low viscosity dispersions. This results in a relatively thin coating on the substrate.

For the above reasons, e.g. those connected with the formation of alkali metal halide in the coating and the effect of the end groups, we prefer not to make the polyethersulphone in situ, i.e. we prefer not to use a precursor to the polyethersulphone, but rather we prefer to employ a preformed polyethersulphone not containing phenate end groups.

To obtain satisfactory coatings, the RV of the polyethersulphone must be below 0.25. It can however be very low—thus polyethersulphones of RV 0.03 have given good results. We prefer to use polyethersulphones of RV between 0.03 and 0.2 and in particular between 0.08 and 0.18. With polyethersulphones at the low end of the molecular weight range, below RV 0.08, there is a greater risk of the presence of organic material that might be extracted in use. Furthermore the very low RV polyethersulphones are harder to make consistently on a commercial scale.

While we prefer to use a single polyethersulphone, blends may be employed. For example a mixture of polyethersulphones of RV below 0.25 may be used, alternatively, but less preferably, a polyethersulphone of RV above 0.25 may be used in admixture with one of RV below 0.25 provided that the RV of the mixture is below 0.25. Where two or more polyethersulphones are employed they may have the same or different repeat units.

It is desirable, in the iterests of coating uniformity and dispersion stability, that the polyethersulphone has a particle size of below 25 μm, as measured by a Micromerograph (Pennwalt Corporation, Pennsylvania, U.S.A.), preferably below 20 μm. Preferably the polyethersulphone has a particle size above 5 μm because it becomes more difficult and time consuming to obtain polyethersulphones of smaller particle size. The use of low molecular weight polyethersulphones (RV below 0.25) also have the advantage that aqueous dispersions thereof can more easily be made than with high molecular weight polyethersulphones. Thus, while it may take a week or more to obtain such a particle size by ball milling a polyethersulphone of RV 0.42, a polyethersulphone of RV 0.21 can be ball milled, under similar conditions, to below 25 μm in less than 24 hours.

Thermoplastic aromatic polyethersulphones comprise repeat units of the general formula —Ar—SO$_2$— in which Ar is a divalent aromatic radical, which may vary from unit to unit in the polymer chain, at least some of the Ar units having the structure

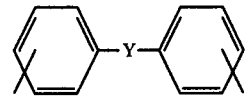

in which Y is oxygen or the divalent radical obtained by removal of the hydrogen atoms from the OH groups of an aromatic diol such as a 4,4'-bisphenol. Up to 50% of the —SO$_2$— groups may be replaced by —CO— groups.

Examples of such polyethersulphones have the repeating units

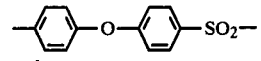

and

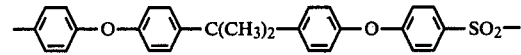

alone or in conjunction with repeating units such as

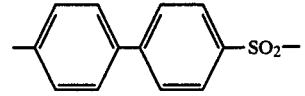

and

Examples of polyethersulphones and processes for their production are described in British Pat. Nos. 1 016 245, 1 060 546, 1 078 234, 1 109 842, 1 122 192, 1 133 561, 1 153 035, 1 153 528, 1 163 332, 1 177 183, 1 234 301, 1 264 900, 1 265 144, 1 296 383, 1 298 821 and 1 303 252, Canadian patent specification No. 847 963, German OLS specifications Nos. 1 938 806 and 2 433 400 and Swiss patent specification No. 491 981.

The compositions of the invention preferably have tetrafluoroethylene polymer/polyethersulphone (or precursor thereto) weight ratios between 9:1 and 1:9, particularly between 4:1 and 1:3.

As the proportion of tetrafluoroethylene polymer is increased, the coatings made from the dispersions become softer and more porous and less strongly adherent to the substrate. On the other hand the non-stick properties of the coatings deteriorate as the proportion of polyethersulphone increases. We therefore particularly prefer to employ tetrafluoroethylene polymer/polyethersulphone weight ratios of between 0.75:1 and 2:1, most preferably between 0.9:1 and 1.4:1.

The dispersion preferably has a combined content of tetrafluoroethylene polymer and polyethersulphone of 20 to 50% by weight of the dispersion. The total solids content of the dispersion (i.e. weight of dispersed polymer plus any pigments, fillers, etc) is preferably 30 to 60% by weight of the dispersion.

The coating dispersion is preferably an aqueous dispersion as this avoids the presence of organic solvents which may present handling problems.

However in some cases the dispersion may be a dispersion of the tetrafluoroethylene polymer in a solution of the polyethersulphone in a solvent such as dimethyl formamide, N-methyl-2-pyrrolidone, dialkyl or diaryl sulphones and sulphoxides including 1,1-dioxothiolan (sulpholane).

Alternatively the tetrafluoroethylene polymer may be dispersed in a dispersion of a polyethersulphone in a mixture of diluents, e.g. water and dimethyl formamide.

However, as stated above, the polyethersulphone is preferably dispersed in water. Such an aqueous dispersion may be made by ball milling polyethersulphone powder or granules with water in the presence of an emulsifier, or by precipitation from solution.

An alternative method of making the polyethersulphone dispersion is by first making a solution of the polyethersulphone in a solvent such as methylene chloride, then forming an emulsion of that solution in water using a suitable emulsifier, e.g. sodium dioctyl sulphosuccinate, and finally evaporating off the solvent.

The tetrafluoroethylene polymer is preferably polytetrafluoroethylene or a copolymer of tetrafluoroethylene with up to 5%, especially 0.05 to 2%, by weight of other monomers such as ethylene, vinyl chloride, hexafluoropropene or perfluoropropyl perfluorovinyl ether, preferably the tetrafluoroethylene polymer is a "lubricant grade" polytetrafluoroethylene powder. Such materials, which are commercially available, e.g. as thermally or irradiation degraded polytetrafluoroethylene powders, and are characterised by an average particle size of less than 20 $\mu$m (as measured optically). Examples of commercially available lubricant grade polytetrafluoroethylene powders are 'Fluon' L169, L170 and L171 sold by Imperial Chemical Industries Limited. For example 'Fluon' L170 is a friable polytetrafluoroethylene powder of 4 $\mu$m median particle size which can be broken down to smaller particle size when processed in various media, e.g. by a high shear mixer.

Other lubricant grade tetrafluoroethylene polymers that may be employed are telomers of tetrafluoroethylene and known telogens which telomers can be obtained by telomeration in an organic medium as described for example in U.S. Pat. Nos. 3,105,824 and 3,067,262, or in aqueous emulsion as described in United Kingdom Pat. No. 1 391 246.

Thus coating dispersions in accordance with the present invention may be made by mixing a lubricant grade polytetrafluoroethylene powder or dispersion into an aqueous polyethersulphone dispersion. Such mixing is conveniently performed using a high shear mixer.

The dispersions may also be made by dry mixing the polyethersulphone and a tetrafluoroethylene polymer powder and then forming a dispersion from the mixture. We therefore further provide, in accordance with the present invention, a mixture of a tetrafluoroethylene polymer and a polyethersulphone of RV less than 0.25.

Other ingredients, e.g. pigments, fillers, emulsifiers, viscosity modifiers, may be incorporated if desired. The incorporation of titanium dioxide as a pigment is particularly preferred as it beneficially affects the sedimentation behaviour of the dispersion and, in some cases, the adhesion of the final coating. Preferred amounts of titanium dioxide are 1–10% by weight of the dispersion.

As disclosed in U.K. Pat. No. 1 337 434 the incorporation of 0.01 to 10% by weight of diphenyl sulphone, based on the weight of the polyethersulphone, into the polyethersulphone may act as a processing aid and its incorporation into the dispersions of the present invention, e.g. prior to milling the polyethersulphone, may give coatings of better appearance.

While it is preferred to utilise lubricant grade polytetrafluoroethylene, it is also possible to utilise tetrafluoroethylene polymer aqueous dispersions. Such dispersions may be made by polymerisation of tetrafluoroethylene in an aqueous medium, normally in the presence of an emulsifying agent. Examples of such processes are described in British Pat. Nos. 689 400 and 821 353. The emulsifying agent is preferably of the anionic type in the form of a fluorinated carboxylic acid compound such as ammonium perfluorooctanoate. For use in this invention, after polymerisation, the dispersion is further stabilized by means of a surfactant and, if necessary, concentrated. A suitable stabilizer is a non-ionic surfactant such as polyoxyethylated octyl phenol containing 9 to 10 moles of ethylene oxide per mole of octyl phenol sold by Rohm and Haas Company under the trademark 'Triton' X100 or a surfactant sold by Rohm and Haas Company under the trademark 'Triton' DN65 and described by the suppliers as a modified ethoxylated straight chain alcohol.

We have found that, while satisfactory coatings can be made by using mixtures, in accordance with the present invention, of an aqueous low molecular weight polyethersulphone dispersion with an aqueous tetrafluoroethylene polymer dispersion, similar coatings made using a high molecular weight (i.e. RV above 0.25) polyethersulphone not only were discontinuous but also exhibited inferior adhesion.

The substrates to which the coating compositions are applied should be clean and free from grease and unless they have a fritted surface are preferably roughened, for example by abrading by grit blasting or by etching. Coatings may be applied by any of the conventional techniques, including spraying, dipping and brushing, followed by drying. The coating is then cured by heating, preferably in the presence of air, at temperatures of 300° C. to 450° C., preferably above 350° C. and particularly between 380° C. to 400° C.

Generally temperatures in excess of 350° C. should be employed but the addition of a cross-linking agent such as sulphur in the coating composition gave a coating of acceptable appearance when cured at temperatures as low as 300° C. However the coatings tended to be softer than those cured at above 350° C.

Likewise when using very low RV polyethersulphones (RV below 0.1) coatings of satisfactory appearance may be made when cured at temperatures as low as 300° C. but the adhesion may, in some cases, be inferior to that obtained when using curing temperatures above 350° C.

Where the polyethersulphone has hydroxyl (—OH) end groups, such a heating step, if carried out in air, will result in an increase in the molecular weight of the polyethersulphone, (as described in our U.K. Pat. No. 1 415 778 for high molecular weight polyethersulphones).

The compositions of the present invention are particularly suitable for use in low friction coating applications where excellent performance is required, for example, resistance to environmental high temperatures, e.g. more than 150° C., consistent with good adhesion to substrates.

The compositions of the invention may be applied as coatings to a variety of substrates, including glass, e.g. for non-stick ovenware and non-stick autoclave linings, ceramics, composite surfaces such as a metal, metals such as ferrous metals, for example cast iron, mild steel, stainless steel, and aluminum and its alloys, and composite surfaces such as metals having a reinforcing coating, such as a sprayed ceramic and/or metal powder coating. The substrate may be in the form of sheet, tube, rod, wire, fibre, or woven fabric.

The compositions are particularly suited to coating cooking utensils for example frying pans, saucepans and bakeware or for oven linings. In making cooking utensils, a blank may be coated and then formed, or an already formed utensil may be coated.

Compositions according to the invention may also be used to form adherent non-stick, low friction, coatings on many other articles including industrial processing equipment including moulds, rollers, stirrers, mixers, chutes, hoppers and heat sealing jaws, domestic articles such as iron sole plates, food mixers and ice separators and tools such as saw blades, electrical applications such as for example wire insulation.

The service temperature that can be employed will depend on the nature of the polyethersulphone. Thus while coatings made from dispersions containing polyethersulphone of repeat unit

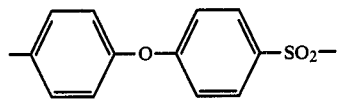

can be used for "top-of-the-stove" cookware, e.g. frying pans, saucepans, as well as ovenware, coatings made from dispersions containing polyethersulphone of repeat unit

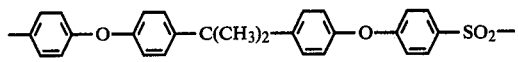

are best used in applications subjected to lower service temperatures, e.g. bakeware, egg boilers, and non cooking utensil applications such as coatings on hair curlers and saws.

One particular non-cookware application for which the dispersions are particularly suited is the coating of glass cloth or other fabrics. For coating glass cloth, it is in some cases desirable to incorporate very fine glass beads in the coating dispersion. Such coated fabrics are of utility in the manufacture of air inflatable structures such as temporary aircraft hangers, exhibition halls, etc. In some cases it is not necessary to cure the coating by heating to above 300° C. This is particularly the case with dispersions made using, as the dispersing medium for the tetrafluoroethylene polymer, a volatile non-aqueous solvent for the polyethersulphone.

Thus satisfactory coatings may be made on fabrics, or other substrates that cannot withstand the normal curing temperatures employed, merely by evaporating off the volatile solvent.

Such solvent based dispersions may also be used for coating polyethersulphone film so as to provide a non-stick coating thereon.

The invention is illustrated by the following Examples: (Examples 1 to 3, 13 and 20 to 22 are comparative.)

EXAMPLE 1

A sample (50 g) of a thermoplastic polyethersulphone having repeat units

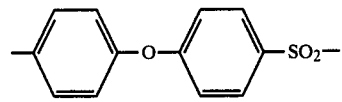

and a reduced viscosity of 0.42 was ball milled with an aqueous solution (200 g) containing 1.25% by weight of an adduct of approximately 9 to 10 moles of ethylene oxide with 1 mole of octyl phenol as a non-ionic emulsifier, in a ceramic ball mill for 432 hours after which time the average particle size was 18 μm as measured by a Micromerograph.

To a portion (142 g) of the resultant dispersion were added: a lubricant grade polytetrafluoroethylene powder median particle diameter 3 to 4 μm, 'Fluon' L171, (14.2 g), titanium dioxide (7.1 g), a carbon black pigment (10.65 g), a further quantity of the non-ionic emulsifier (5.68 g of a solution containing 1 part by weight of emulsifier to 2 parts by weight of water) and a hydrous magnesium silicate viscosity modifier, (7.17 g of a gel made by mixing 2.5 parts by weight of Bentone EW with 97.5 parts by weight of water).

These ingredients were mixed with the polyethersulphone dispersion using a Silverson mixer.

The dispersion was then sprayed on to a degreased aluminium plate which was then dried in an air oven at 80° C. for 10 minutes and then sintered in air at 400° C. for 10 minutes.

The coating thickness was 21 μm as measured by a "Permascope" (Helmut Fischer GmbH, Maichingen, Germany).

To assess adhesion of the coating the following procedure is adopted:

The test plaque is immersed in boiling water for 15 minutes and then dried. A cross-hatch pattern of cuts providing approximately 2 mm×2 mm squares over an area of 650 mm² is then applied to the coating using a razor blade to cut through the coating and into the metal. A length of 25 mm wide, pressure-sensitive, adhesive tape is firmly pressed over the cross-hatched area and the tape is subsequently pulled sharply backwards at an angle of 45° to the direction of application. The application, and removal, of tape to the cross-hatched area is repeated with fresh pieces of tape until there is evidence that the coating is detaching from the metal or, if no failure is observed, up to a maximum of 15 times. A coating that survives five applications is considered satisfactory. The adhesion can also be assessed qualitatively by the ease of peeling off the coating (after the immersion in boiling water) with a thumbnail after penetrating the coating with a scalpel to expose the aluminium substrate. The ease of removal is assessed on a scale of 5 (good) to 0 (poor). A grading of 4 or lower is recorded as a failure. The coating of this example had a grading of 5. Thus by both tests the adhesion was satisfactory.

EXAMPLES 2 TO 10

Example 1 was repeated, but stopping the milling as soon as the polyethersulphone had reached a suitable particle size, with polyethersulphones of differing reduced viscosities. As slightly different sized samples of the polyethersulphone dispersion were taken for mixing with the polytetrafluoroethylene and other ingredients, the quantities of the polytetrafluoroethylene and other ingredients employed were adjusted to ensure that the coating compositions had the same solids content and proportions of ingredients. The results are shown in Table 1. In all cases adhesion, as assessed by both methods, was adequate.

Similar results were obtained using the polyethersulphone of repeat unit

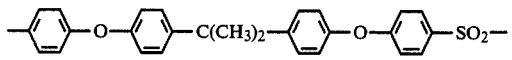

in place of that of repeat unit

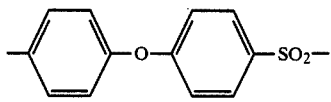

EXAMPLE 11

A polytetrafluoroethylene containing dispersion was made up as in Example 1 but using the potassium salt of 4-(4-chlorophenylsulphonyl)phenol (37.5 g) dissolved in water (104.5 g) in place of the 142 g of polyethersulphone dispersion.

The results are shown in Table 1. The adhesion was satisfactory as measured by the adhesive tape test but on the thumbnail test the adhesion was inferior to that of the coatings of Examples 1 to 10.

TABLE 1

| Example | Polyethersulphone RV | Milling time (hours) | Milled polysulphone particle size (μm) | Coating Thickness (μm) | Nature |
|---------|------|------|------|------|------|
| 1 | 0.42 | 432 | 18.0 | 21 | D |
| 2 | 0.35 | 240 | 23.8 | 54 | D |
| 3 | 0.28 | 336 | 18.4 | 35 | D |
| 4 | 0.21* | 20 | 14.4 | 19 | NC |
| 5 | 0.18 | 24 | 15.5 | 14 | C |
| 6 | 0.16** | 24 | 15.5 | 12 | C |
| 7 | 0.15 | 18 | 10.2 | 22 | C |
| 8 | 0.10 | 16 | 17.3 | 8 | C |
| 9 | 0.08 | 19 | 10.0 | 24 | C |
| 10 | 0.03 | 17 | 18.0 | 9 | C |
| 11 | *** | — | — | 13 | C |

D = discontinuous (speckled appearance).
NC = nearly continuous (a few "pinholes").
C = continuous (uniform mat appearance).
* = polymer having 5.8 OH end groups per 100 polymer repeat units.
** = polymer having 12 OH end groups per 100 polymer repeat units.
*** = potassium 4-(4-chlorophenylsulphonyl)phenate instead of polyethersulphone.

EXAMPLE 12

A dispersion similar to that of Example 7 (polyethersulphone RV 0.15) was made but using an aqueous polytetrafluoroethylene dispersion ('Fluon' GP1) in place of the lubricant powder ('Fluon' L171). The amount of the polytetrafluoroethylene dispersion employed (which contained 60% by weight of polytetrafluoroethylene and 6% by weight of a non-ionic surfactant and was made by polymerisation of tetrafluoroethylene in an aqueous medium in the presence of a perfluorinated emulsifier followed by concentration) was such as to give a polytetrafluoroethylene/polyethersulphone weight ratio of 1:2.

Aluminium plates were coated using the above mixture and the conditions employed in the preceding Examples.

The coating, of thickness 10 μm, was continuous having a slightly misty appearance and adequate adhesion.

EXAMPLE 13

By way of comparison Example 12 was repeated but, in place of the polyethersulphone of RV 0.15, a hydroxy ended polyethersulphone (1.02 OH groups per 100 polymer repeat units) of RV 0.49 was used. The ball milling time to give a polyethersulphone dispersion of average particle size 14 μm was 168 hours.

The coating was discontinuous and also failed the thumbnail adhesion test, being scraped off on the first scratch with the thumbnail.

EXAMPLES 14 TO 19

Example 7 was repeated but using different proportions of the polyethersulphone of RV 0.15 so that the dispersions had tetrafluoroethylene polymer/polyethersulphone weight ratios ranging from 0.5:1 to 2:1. The curing times were increased to 15 minutes at 80° C. and 15 minutes at 400° C. The results are shown in Table 2.

TABLE 2

| Example | PTFE/polyethersulphone ratio | Brookfield Viscosity (CP) at 30 rpm | Appearance (under 50× magnification) |
|---------|------|------|------|
| 14 | 0.5:1 | 536 | Good |
| 15 | 1:1 | 764 | Good |
| 16 | 1.21:1 | 593 | Good |
| 17 | 1.48:1 | 693 | Slightly porous |
| 18 | 1.73:1 | 767 | Porous |
| 19 | 2:1 | 550 | Porous |

The adhesion of the coatings of Examples 18 and 19 was slightly inferior (on the thumbnail test) to that of Examples 14 to 17. The adhesion of all the coatings as assessed by the adhesive tape test was satisfactory.

EXAMPLES 20 TO 22

By way of comparison dispersions similar to those of Example 7 were made but using a polyphenylene sulphide ('Ryton' V1 sold by Phillips Petroleum Company) in place of the polyethersulphone. The milling time, to average particle size 13 μm, was 18 hours. Dispersions were made with varying tetrafluoroethylene polymer/polyphenylene sulphide ratios.

Aluminium plates were coated with the dispersions using the conditions adopted in the previous Examples. The coatings were continuous but had poor adhesion as shown in Table 3.

TABLE 3

| Example | Polytetrafluoroethylene polyphenylene sulphide weight ratio | Adhesion Adhesive Tape test | Adhesion Thumbnail test |
|---------|------|------|------|
| 20 | 1:1 | Fail | Fail |
| 21 | 1:2 | Borderline | Fail |
| 22 | 1:3 | Adequate | Fail |

We claim:
1. A coated article having an adherent coating formed from a dispersion comprising a tetrafluoroethylene polymer selected from tetrafluoroethylene homopolymers, telomers, or copolymers with up to 5% by weight of a comonomer, selected from the group consisting of ethylene, vinyl chloride, hexafluoropropene and perfluoropropyl perfluorovinyl ether, said tetrafluoroethylene polymer having an average particle size of less than 20 μm, dispersed in an inert diluent, said diluent having a thermoplastic aromatic polyethersulphone of reduced viscosity below 0.25 (as measured at 25° C. on a solution of the polymer in dimethyl formamide containing 1 g of polymer in 100 cm³ of solution) dissolved or dispersed as particles of size below 25 μm (as measured by a Micromerograph) therein, or the precursor to such a polyethersulphone, said thermoplastic aromatic polyethersulphone having repeat units of the general formula —Ar—SO₂— in which Ar is a divalent aromatic radical, at least some of the —Ar— units having the structure

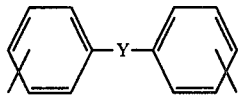

in which Y is oxygen or the divalent radical obtained by removal of the hydrogen atoms from the —OH groups of an aromatic diol and in which 0 to 50% of the —SO₂— groups are replaced by —CO— groups, said dispersion having a tetrafluoroethylene polymer/polyethersulphone (or precursor thereto) weight ratio between 4:1 and 1:3.

2. A method of coating a substrate comprising applying a dispersion to the substrate, said dispersion comprising a tetrafluoroethylene polymer selected from tetrafluoroethylene homopolymers, telomers or copolymers with up to 5% by weight of a comonomer, selected from the group consisting of ethylene, vinyl chloride, hexafluoropropene and perfluoropropyl perfluorovinyl ether, said tetrafluoroethylene polymer having an average particle size of less than 20 μm, dispersed in an inert diluent, said diluent having a thermoplastic aromatic polyethersulphone reduced viscosity below 0.25 (as measured at 25° C. on a solution of the polymer in dimethyl formamide containing 1 g of polymer in 100 cm³ of solution) dissolved or dispersed as particles of size below 25 μm (as measured by a Micromerograph) therein, or the precursor to such a polyethersulphone, said thermoplastic aromatic polyethersulphone having repeat units of the general formula —Ar—SO₂— in which Ar is a divalent aromatic radical, at least some of the —Ar— units having the structure

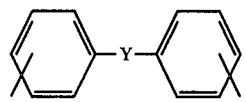

in which Y is oxygen or the divalent radical obtained by removal of the hydrogen atoms from the —OH groups of an aromatic diol and in which 0 to 50% of the —SO₂— groups are replaced by —CO— groups, said dispersion having a tetrafluoroethylene polymer/polyethersulphone (or precursor thereto) weight ratio between 4:1 and 1:3, and then removing the inert diluent to form a coating, and thereafter curing the coating at a temperature within the range 300° to 450° C.

3. A method according to claim 2 wherein the coating is cured at a temperature above 350° C.

4. A method according to claim 2 wherein the coating is cured at a temperature between 380° and 400° C.

5. A method according to claim 2 wherein the substrate is a metal.

6. A method according to claim 2 wherein the substrate is a fabric.

* * * * *